Figure 1:
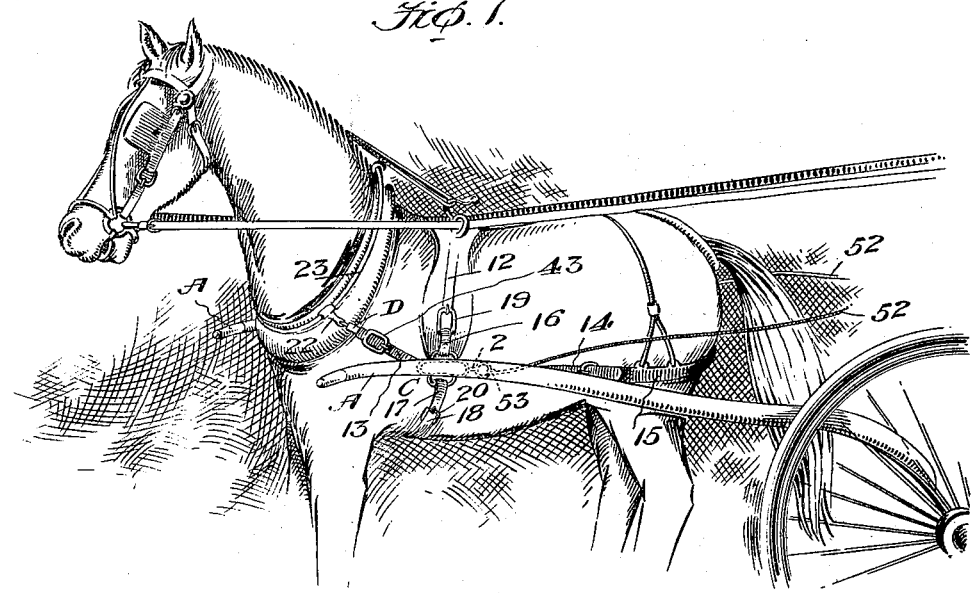

F. E. GRIFFETH.
DEVICE FOR ATTACHING AND DETACHING HORSES TO AND FROM VEHICLES.
APPLICATION FILED MAY 9, 1913.

1,129,567.

Patented Feb. 23, 1915.

Inventor
Francis E. Griffeth
By Edson Bro's
Attorneys

Witnesses

THE NORRIS PETERS CO., PHOTO-LITHO., WASHINGTON, D. C.

UNITED STATES PATENT OFFICE.

FRANCIS E. GRIFFETH, OF ATHENS, GEORGIA.

DEVICE FOR ATTACHING AND DETACHING HORSES TO AND FROM VEHICLES.

1,129,567.  Specification of Letters Patent.  Patented Feb. 23, 1915.

Application filed May 9, 1913. Serial No. 766,650.

*To all whom it may concern:*

Be it known that I, FRANCIS E. GRIFFETH, a citizen of the United States, residing at Athens, in the county of Clarke and State of Georgia, have invented certain new and useful Improvements in Devices for Attaching and Detaching Horses to and from Vehicles; and I do hereby declare the following to be a full, clear, and exact description of the invention, such as will enable others skilled in the art to which it appertains to make and use the same.

This invention is a device for attaching and detaching horses to and from vehicles and is especially designed as an improvement on my previous Patents, Nos. 652,260 and 883,134.

The object of this invention is to provide a simple, inexpensive and easily operated device by which horses may be very quickly attached to the shafts of a vehicle and more quickly detached therefrom.

Another object of the invention is to construct the member that connects the hame tug or breast strap, girth, saddle, and hold backs, so that the saddle and girth straps may be in their proper alinement with relation to the animal at all times.

Heretofore a device has been used similar to that shown in Patent No. 883,134, wherein the member which allows of the harness being detachably connected to the shafts is used connected with the draft equalizer. This, however, because of its size and place of use, does not permit of its proper adjustment to different sizes of horses and it is, therefore, a further object of this invention to overcome these objections by so constructing the draft equalizer as to permit of its use as a hame tug, or in connection with the breast strap, thus allowing the same more freedom in operation and permitting of improved results over those heretofore obtained.

A still further object in using the draft equalizing contrivance as a hame tug or on the breast strap is to give a direct or straight line of draft from the horse's shoulders, and thus eliminate the frictional wear caused by the angular connection of the hame tug and the spring actuated draft rod which was heretofore made rigid on the shafts of the vehicle.

A still further object of the invention is to provide economical means which permits of the traces, shaft tugs, and swingletree being dispensed with.

With these and other purposes in view, the invention consists of a spring-actuated draft equalizer in combination with a hame tug or breast strap, saddle, girth and hold back connector, referred to hereinafter as a connecting member, and means connected to said member whereby the driver by a single operation may instantly release the animal from the vehicle in case of a runaway or other accident.

This invention also consists in the features of construction and combination of parts hereinafter described, illustrated in the accompanying drawing, and specified in the appended claim.

Figure 2:
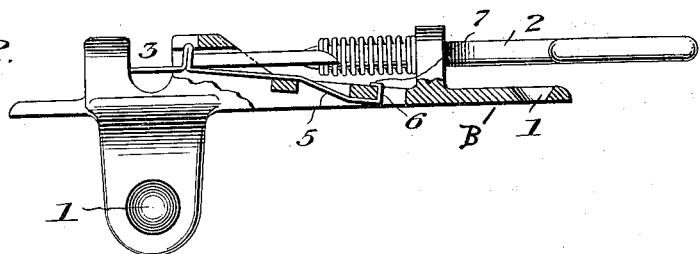
Figure 3:
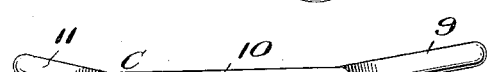
Figure 4:
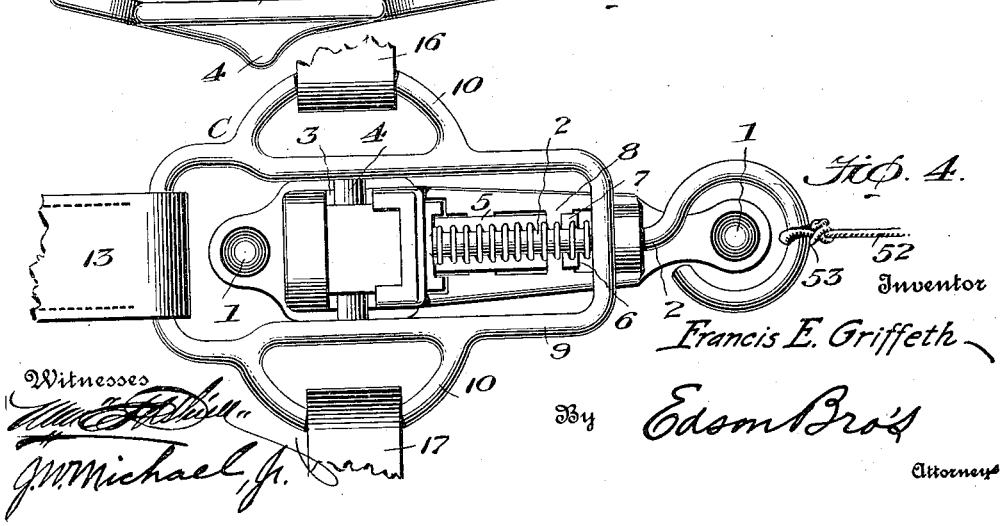

In the drawings, which disclose the preferred embodiment of the invention, Figure 1 shows a horse harnessed and attached to a vehicle, in accordance with the invention. Fig. 2 is a side elevation of the shaft embracing member, partly in section. Fig. 3 is an edge view of the member to which the harness is connected. Fig. 4 is a plan view showing the shaft-embracing member and harness-connecting member assembled.

Like letters of reference denote corresponding parts in all the figures of the drawings, wherein:—

A, A are the shafts of the vehicle, B the shaft embracing member to which the hame tug or breast strap, saddle, girth and hold back connecting member C is detachably fastened, D is the draft equalizing hame tug, and E is the type of draft equalizer used when the breast strap is employed in place of the hame.

The hitching and unhitching device consists principally of two members B and C. The member B is formed with suitable fastening means shown as ears having screw eyes 1, so that the same may be rigidly secured to the inner surface of the shafts A, A of the vehicle, and is provided with a spring-actuated plunger 2 adapted to open or close a slotted portion 3 of the member B for the reception of a cross bar 4 of the harness connecting member C. This shaft embracing member B is the same as that described in my Patent No. 883,134, with the exception that the resilient member 5 instead of having its retaining flange 6 formed at substantially right angles thereto is provided with a turned over portion 7 adapted to engage the cross piece 8 of the shaft embracing member B for the purpose of retaining the same against accidental dislodgment. Heretofore, the resilient member 5 has frequently become displaced, thus rendering the entire appliance inoperative.

The harness connecting member C made for the express purpose of forming means whereby it is made possible to attach the hame tug or breast strap, the saddle strap, the girth strap and the hold back all to the shaft embracing member B at the same time is provided with the cross bar 4 positioned out of the plane of said member C which is made to engage the resilient member 5 of the shaft embracing member C, thereby releasing the plunger 2 and locking the harness connecting member C in operative position. The harness connecting member C has a substantially rectangular shaped body portion 9 with preferably integral arcuate loops 10 formed on either side thereof. It will be noted from the drawings that one end of the rectangular shaped body portion 9 of the harness connector C is slightly enlarged, as shown at 11. This is for the reception of the hame tug connection piece 13 and directly opposite this the hold back 14, which connects with the hip strap 15, is attached. Corresponding to the hame tug connection piece 13 which is permanently attached to the forward end of the connection member C are pieces 16 and 17 for connecting with the saddle strap 12 and the girth strap 18. These pieces are permanently attached to the arcuate loops 10, the upper one 16 of which is shown in the form of a buckle 19 for the reception of the saddle strap 12, while the lower one 17 is a short strap for engaging the buckle 20 of the girth strap 18. The curving of the loops 10 makes it possible for the saddle and girth straps to remain in proper alinement when the shafts carrying this member C move forward in traveling down hill or backward when a hard pull is experienced.

Used in connection with this release appliance are draft equalizers shown in the form of a hame tug at D and in use with a breast strap at E, for the purpose of relieving the animal's shoulders from sudden shocks and jerks which would be experienced if such an auxiliary device were not used in connection therewith.

The hame tug D and the draft equalizer E used on the breast strap F are substantially of the same construction with the exception that the breast strap equalizer E is made preferably smaller than the hame tug D, and that the loop 21 for connecting said hame tug to the metallic member 22 of the hame 23 is left disconnected on one side thereof, as shown in Fig. 1, in order that the same may engage the hole 24 formed in said member 22 and then riveted thereon by means of an upstanding lug 25 formed on the projection 26 engaging a hole 27 in the loop 21 and by one operation being upset on the outer surface of said loop, thus forming a permanent connection between the hame 23 and hame tug D; the loop 28 used in connection with the breast strap equalizer E is shown substantially rectangular in shape and integrally connected to the body of said equalizer E. Said loop 28 is adapted to receive a strap 29 of the breast strap F which holds the same against longitudinal displacement, and a substantially circular shaped loop 30 preferably made of leather is fastened on the breast strap F and adapted to receive a portion of the equalizer E for the purpose of holding the same in proper alinement with respect to the harness connecting member C. The hame tug D is preferably covered with leather which is held in place by any suitable means.

In actual use of the invention, the appliance is attached to an ordinary set of single harness and placed in position on an animal in the usual way, the animal is then backed into the shafts until the harness connecting member C comes directly opposite the shaft embracing member B, the cross bar 50 of the connecting member C is then pressed against the resilient member 5 of the shaft embracing member B, thus releasing the spring actuated plunger 2 and locking the harness connector C to the shafts. To detach the animal from the vehicle, it is only necessary to retract the spring actuated plunger 2 by suitable means and allow the cross bar 4 of the connecting member C to be forced out of the slot 3, by the resilient member 5 of the shaft embracing member B. This can be accomplished by standing beside the shafts of the vehicle or while seated in the vehicle by pulling on the cords 52 which are connected to the plungers 2 at 53. In case of a runaway, the horse is released almost instantly by pulling on the cords 52. The shafts may be supported from engagement with the ground by said cords and the vehicle thus guided safely until it comes to a stop. The releasing operation is substantially the same as that described in my Patent 883,134.

The right is herein reserved to make such changes in the construction of my device as may fairly fall within the scope of my invention without departing from the spirit or sacrificing the advantages of the same.

Having thus fully described my invention, what I claim as new and desire to secure by Letters Patent is:

In a device of the class described, a harness connecting member comprising substantially rectangular shaped body engaging portions converging to a junction line between the extremities of the body engaging portions, and a transverse bar substantially in the vertical plane of such line but laterally offset from the latter, and loops positioned near the opposite ends of said transverse bar, said loops lying in the same plane, which plane is offset from said transverse bar and is substantially parallel to the plane joining the extremities of said converging body engaging portions.

In testimony whereof, I affix my signature, in presence of two witnesses.

FRANCIS E. GRIFFETH.

Witnesses:
W. E. GRIFFETH,
M. E. SHOOK.

Copies of this patent may be obtained for five cents each, by addressing the "Commissioner of Patents, Washington, D. C."